Patented Feb. 11, 1941

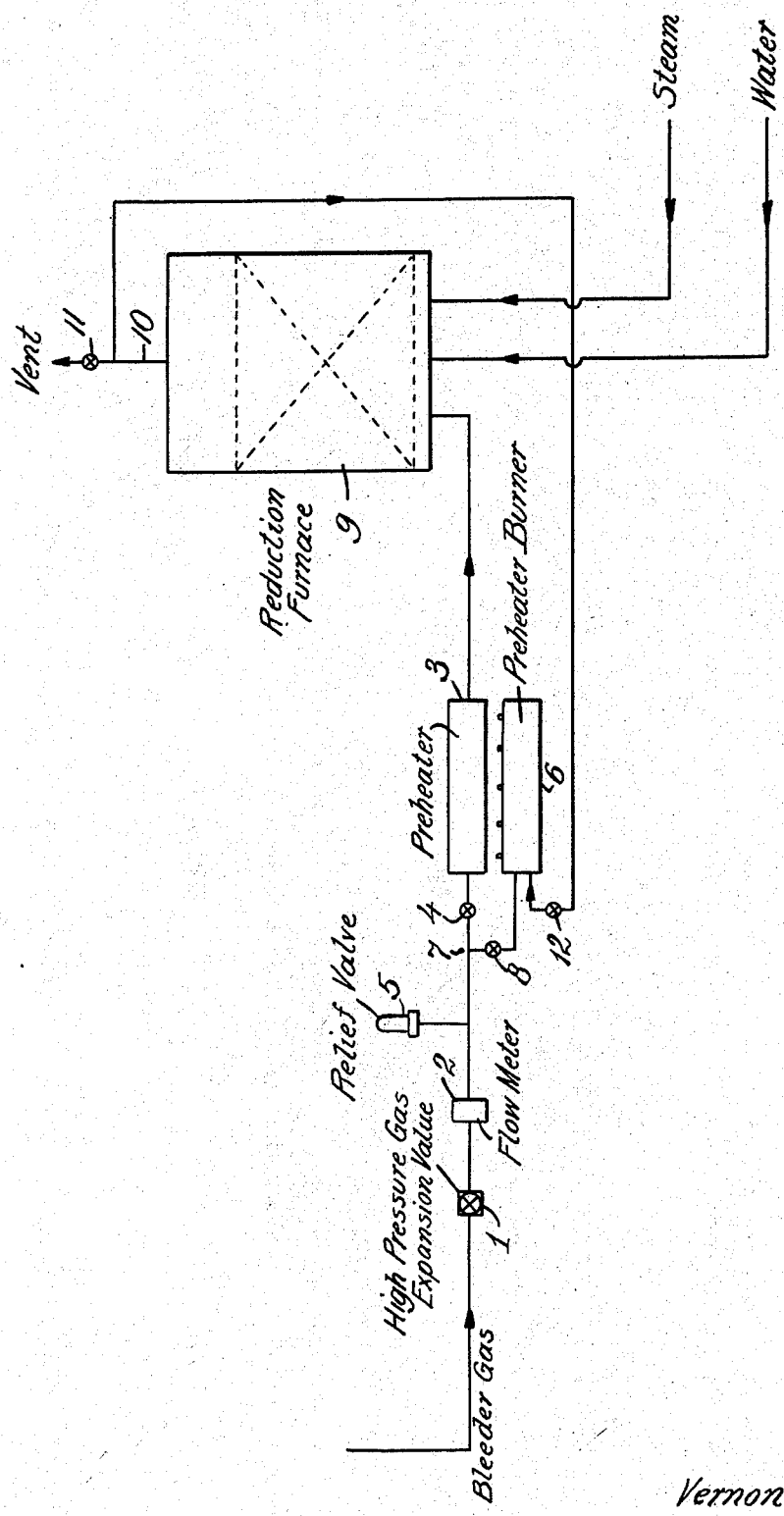

2,231,202

UNITED STATES PATENT OFFICE 2,231,202

OXIDATION OF AMMONIA

Vernon M. Stowe, Petersburg, Va., assignor to The Solvay Process Company, New York, N. Y., a corporation of New York Application June 28, 1938, Serial No. 216,213

9 Claims. (Cl. 23—162)

This invention relates to processes for the manufacture of catalysts. More particularly this invention relates to a process for the reactivating of spent cobalt oxide catalysts used in the oxidation of ammonia.

United States Patent No. 1,952,911 issued to De Rewal on March 27, 1934, discloses a process for reactivating cobalt oxide catalysts involving digesting the catalyst with hydrochloric acid, separating the catalyst material from the acid, wetting it with nitric acid and igniting. Furthermore, United States Patent No. 2,017,683 issued to Crittenden on October 15, 1935 describes a process for preparing highly active cobalt oxide catalysts for the oxidation of ammonia from cobalt oxide of low catalytic activity or from cobalt oxide catalyst which has become spent through prolonged use in the oxidation of ammonia, which involves reducing the oxide to cobalt metal with carbon in an electric furnace, treating the cobalt metal thus obtained with a flux, separating the fused metal from the slag which forms, and then converting the thus treated cobalt metal to cobalt oxide catalyst. While this latter process produces highly active cobalt oxide catalysts for the oxidation of ammonia, a certain amount of the metal may be lost in the fluxing operation.

An object of this invention is to provide a simple and economical method for preparing cobalt oxide catalysts for the oxidation of ammonia from cobalt oxide catalysts the catalytic activity of which has been decreased by use for the oxidation of ammonia or from other grades of cobalt oxide of relatively low catalytic activity.

I have made the surprising discovery that highly active cobalt oxide catalysts for the oxidation of ammonia may be produced from cobalt oxide catalysts the catalytic activity of which has been decreased by use for the oxidation of ammonia and from other grades of cobalt oxide of low catalytic activity, e. g. commercial cobalt oxide, by reducing the oxide to cobalt metal with a hydrogen-containing gas and converting the cobalt metal thus obtained to cobalt oxide. I have also found that the reduction of cobalt oxide by passing a hydrogen-containing gas thereover produces a cobalt metal which is highly reactive and especially suitable for dissolving in nitric acid. Due to its reactivity, it may be dissolved in nitric acid without the use of an excess of the acid; hence a substantially neutral cobalt nitrate solution results. Iron, phosphorus and other impurities are insoluble in this neutral solution and can be filtered off, whereby the production of a catalyst of high activity is effected.

In accordance with the process of this invention, cobalt oxide, preferably in granular form, is reduced by passing hydrogen-containing gases thereover. The cobalt oxide which is to be treated according to this invention may contain particles of undesirable fineness which impede the flow of the hydrogen-containing gas through the oxide mass. These fines are, therefore, removed from the remaining oxide material by screening, granulated by ignition with a relatively small amount of cobalt nitrate, and the granules added to the oxide mass being treated. The hydrogen-containing gas may be substantially pure hydrogen or any hydrogen-containing gas containing above approximately 10% hydrogen, e. g. a gas containing 40% hydrogen, and having no substances therein which would poison or otherwise detrimentally affect the catalytic activity of the product of this invention. In cases where the preparation of the catalyst is carried out in conjunction with the synthesis of ammonia, a hydrogen-containing gas eminently adapted for the purposes of this invention is available in large quantities in the form of the bleeder gas withdrawn from the ammonia synthesis system. This gas contains about 65% hydrogen and contains no substances which would, on contact with the cobalt oxide being treated, tend to poison or otherwise detrimentally affect the catalyst produced by the process of this invention. Whenever the term "bleeder gas" is used in the specification and claims, it is to be understood bleeder gas from ammonia synthesis is referred to.

It has been found the reduction of cobalt oxide in accordance with this invention proceeds almost adiabatically at temperatures between about 320° and about 500° C. It is therefore desirable to preheat the hydrogen-containing gas before passing it over the cobalt oxide to temperatures within this range, for under such conditions, providing the enclosure in which the reduction is carried out is properly insulated, the reduction may be effected without supplying any additional heat to the oxide. The rate of flow of gas through the reduction chamber may vary considerably but when using bleeder gas a rate of flow of about 1000 volumes of gas per volume of catalyst per hour has been found suitable. The time necessary to effect substantially complete reduction of the cobalt oxide will, of course, vary depending upon the hydrogen content of the gas and the rate of flow thereof; however, when carrying out the reduction according to the preferred embodiment of this invention, i. e. when bleeder gas is passed over the cobalt oxide at a rate of about 1000 volumes per part of cobalt oxide per hour, it has been found substantially complete reduction of the cobalt oxide may be effected in about an hour.

The reduction of cobalt oxide as above described produces cobalt metal; it has been found the metal thus produced is in a pyrophoric condition so that it is necessary to submerge it in water during storage or handling. The cobalt metal may be converted to cobalt oxide catalyst in any suitable manner. Since the cobalt metal produced by the process of this invention is in such a form that it is readily soluble in nitric acid, preferably the metal is converted to the oxide by dissolving the metal in nitric acid, evaporating the solution to recover cobalt nitrate therefrom, and igniting the nitrate to produce cobalt oxide. As above indicated, I have found the solution of the cobalt metal produced in accordance with this invention may be effected without using a substantial excess of the acid over that necessary to combine with the cobalt so that a substantially neutral solution of cobalt nitrate may be formed; this is particularly advantageous not only because it results in a saving of acid but also because in such neutral solutions any impurities such as iron and phosphorus present in the cobalt metal, the presence of which in the catalyst product tends to impair its efficiency form insoluble precipitates, e. g. iron oxide or hydroxide, iron phosphate, etc., and thus these impurities may be removed by a simple filtration. Furthermore, any cobalt oxide which remains unreduced or which has been accidentally re-oxidized may be removed from the substantially neutral solution formed and returned to the reduction step of the process of this invention. The reduction of cobalt oxide in accordance with this invention when followed by the above method of dissolving the cobalt metal effects the production from either crude commercial cobalt oxide or from spent cobalt oxide ammonia oxidation catalysts of a catalyst containing practically no impurities and having a higher degree of porosity and a higher catalytic activity than catalysts produced by other methods.

In the accompanying drawing forming a part of this specification and showing for purposes of exemplification a preferred form of apparatus in which this invention may be carried out, bleeder gas is withdrawn from the ammonia synthesis system, passed through high pressure gas expansion valve 1 and then through flowmeter 2 to preheater 3 through valve 4. Relief valve 5 is also provided in the line. Preheater burner 6 supplies heat to preheater 3. The fuel for preheater burner 6 may be obtained by tapping the bleeder gas line at 7 and withdrawing a portion of the bleeder gas through valve 8 to burner 6; or the fuel may be supplied from the exit gases from reduction furnace 9, as hereinafter described. In preheater 3 the bleeder gas is heated to a temperature between about 320° and about 500° C. It is then passed into reduction furnace 9, which is preferably heat insulated, wherein the cobalt oxide in granular form is disposed. The gas, after passage over the cobalt oxide, is removed from reduction furnace 9 at 10 and may be vented through valve 11 or passed to preheater burner 6 through valve 12, as above described. When reduction is complete, steam is passed into reduction furnace 9 to cool the reduced metal, after which water is passed into furnace 9 to submerge the cooled metal, which, as above pointed out, is pyrophoric.

The following examples are illustrative of this invention. Amounts are given in parts by weight. The oxidation efficiencies mentioned in the examples represent the efficiency of the particular catalyst in converting a mixture of air and ammonia containing 8.7% ammonia to nitrogen oxides at a temperature of 780° C., and a pressure of one atmosphere, the gas being passed over the catalyst at a space velocity of 45,000.

*Example 1.*—460 parts of cobalt oxide, the catalytic activity of which had been decreased by use for the oxidation of ammonia, were brought to a temperature of 350° C. Bleeder gas at approximately the same temperature and containing 65% hydrogen was then passed over the heated cobalt oxide at a rate of about 250 liters per hour. At the end of one hour it was found that substantially all the cobalt oxide had been reduced to cobalt metal. The metal thus obtained was dissolved in about 1,500 parts of 68% nitric acid, the solution evaporated to obtain cobalt nitrate crystals, and the nitrate crystals ignited at 500° C. to produce cobalt oxide. By this process approximately 440 parts of cobalt oxide were obtained, the oxidation efficiency of a screened portion of which was 97% as compared to that of spent catalyst granules of substantially the same size, which was only 91.8%.

*Example 2.*—460 parts of cobalt oxide, the catalytic activity of which had been decreased by use for the oxidation of ammonia, were reduced in the manner described in Example 1, dissolved in about 1,360 parts of 68% nitric acid, and the solution evaporated. The cobalt nitrate was recovered in two lots; one lot being obtained by fractionally crystallizing approximately 50% of the cobalt nitrate from the solution, and the other being obtained by evaporation of the mother liquor. Both these samples were ignited at 500° C. to form cobalt oxide catalyst.

In the following table, Samples 1 and 2 are cobalt oxide catalysts prepared in accordance with Example 2, Sample 1 being obtained from ignition of cobalt nitrate crystals recovered by fractional crystallization, and Sample 2 being obtained by evaporation and ignition of the mother liquor. Sample 3 is a cobalt oxide catalyst reactivated by heating 230 parts of the same spent catalyst as used in Example 2 with 200 parts of 5% hydrochloric acid, separating the acid and catalyst by decantation, washing the catalyst with water, wetting it with 60 parts of 68% nitric acid, heating to evaporate the acid, and igniting at 500° C. Sample 4 is the untreated spent cobalt oxide catalyst.

| Sample No. | Apparent density, gm./c. c. | Average oxidation efficiency |
|---|---|---|
| | | *Percent* |
| 1 | 0.78 | 97.9 |
| 2 | 0.80 | 97.4 |
| 3 | 1.62 | 95.7 |
| 4 | 1.68 | 91.8 |

It is obvious from the above table that cobalt oxide catalysts having high oxidation efficiencies may be prepared in accordance with my invention from spent cobalt oxide ammonia oxidation catalysts of relatively low efficiency. Furthermore, the oxidation efficiencies of catalysts prepared by the process of my invention are distinctly higher than those of catalysts reactivated by treatment with hydrochloric and nitric acids as described. It is also apparent that catalysts reactivated in accordance with this invention have a higher degree of porosity, i. e., have a lower apparent density than catalysts reactivated by other processes.

While the above examples describe the process of my invention as applied to the preparation of highly active cobalt oxide catalysts from cobalt oxide catalysts, the catalytic activity of which has been decreased by use for the oxidation of ammonia, it will be understood these examples are for the purposes of illustration only and that my invention is also applicable to the preparation of highly active cobalt oxide catalysts from other grades of cobalt oxide of low catalytic activity, e. g., commercial cobalt oxide.

By the process of this invention it is possible to obtain highly active cobalt oxide catalysts for the oxidation of ammonia in a simple and economical manner. Losses of metal are almost entirely avoided and impurities in the cobalt oxide starting material may be readily removed. This process is therefore extremely useful in the manufacture of cobalt oxide catalysts for the oxidation of ammonia.

I claim:

1. A process for the production of cobalt oxide catalysts which comprises reducing cobalt oxide to cobalt metal with a hydrogen-containing gas at a temperature in the range of about 320° to 500° C. and thereafter converting the cobalt metal substantially completely to cobalt oxide.

2. A process for regenerating spent cobalt oxide catalysts for the oxidation of ammonia which comprises reducing the spent cobalt oxide to cobalt metal by passing a hydrogen-containing gas thereover at a temperature in the range of about 320° to 500° C. and converting the cobalt metal thus obtained substantially completely to cobalt oxide.

3. A process for the production of cobalt oxide catalysts for the oxidation of ammonia which comprises treating a form of cobalt oxide, which is of low activity as an ammonia oxidation catalyst, with a hydrogen-containing gas at a temperature in the range of about 320° to 500° C. to reduce the cobalt oxide to cobalt metal, and converting the cobalt metal thus obtained substantially completely to a form of cobalt oxide which is of high activity as an ammonia oxidation catalyst.

4. A process for producing cobalt oxide catalysts which comprises reducing cobalt oxide to cobalt metal with bleeder gas at a temperature in the range of about 320° to 500° C. and converting the cobalt metal substantially completely to cobalt oxide.

5. A process for producing cobalt oxide catalysts for the oxidation of ammonia from cobalt oxide catalysts, the catalytic activity of which has been decreased by use for oxidation of ammonia, which comprises reducing the spent cobalt oxide to cobalt metal with bleeder gas at a temperature in the range of about 320° to 500° C. and converting the cobalt metal substantially completely to cobalt oxide.

6. A process for producing cobalt oxide catalysts which comprises reducing cobalt oxide to cobalt metal with a hydrogen-containing gas at a temperature in the range of about 320° to 500° C., dissolving the cobalt metal substantially completely in nitric acid, and evaporating and igniting the solution of cobalt nitrate to produce cobalt oxide.

7. A process for the production of cobalt oxide catalysts of high activity for the oxidation of ammonia from cobalt oxide catalysts, the catalytic activity of which has been decreased by use for the oxidation of ammonia, which comprises screening the spent cobalt oxide to remove cobalt oxide fines, granulating the fines by ignition with a relatively small amount of cobalt nitrate, mixing the granules with the remainder of the spent cobalt oxide, reducing the cobalt oxide to cobalt metal with bleeder gas containing approximately 65% hydrogen at a temperature in the range of about 320° to 500° C., dissolving the cobalt metal substantially completely in nitric acid, the amount of nitric acid used being not substantially in excess of that required to combine with the cobalt metal, filtering the solution, evaporating the solution to recover nitrate crystals, and igniting the crystals to produce cobalt oxide.

8. A process for the oxidation of ammonia which comprises contacting a gas containing ammonia and oxygen with a catalyst prepared by reducing cobalt oxide to cobalt metal by means of a hydrogen-containing gas at a temperature in the range of about 320° to 500° C. and converting the cobalt metal thus obtained substantially completely to cobalt oxide.

9. A process for the oxidation of ammonia which comprises contacting a gas containing ammonia and oxygen with a catalyst prepared by reducing a cobalt oxide catalyst, the catalytic activity of which has been decreased by use for the oxidation of ammonia, with bleeder gas at a temperature in the range of about 320° to 500° C. and converting the cobalt metal thus obtained substantially completely to cobalt oxide.

VERNON M. STOWE.